(12) United States Patent
Goda

(10) Patent No.: US 11,372,581 B2
(45) Date of Patent: Jun. 28, 2022

(54) INFORMATION PROCESSING APPARATUS AND CONTROL METHOD THEREOF AND PROGRAM REGARDING READING A BOOT PROGRAM

(71) Applicant: CANON KABUSHIKI KAISHA, Tokyo (JP)

(72) Inventor: Junichi Goda, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 16/572,282

(22) Filed: Sep. 16, 2019

(65) Prior Publication Data
US 2020/0104075 A1 Apr. 2, 2020

(30) Foreign Application Priority Data
Sep. 28, 2018 (JP) .............................. JP2018-185428

(51) Int. Cl.
*G06F 3/06* (2006.01)
*G06F 13/16* (2006.01)
*G06F 13/42* (2006.01)

(52) U.S. Cl.
CPC .......... *G06F 3/0659* (2013.01); *G06F 3/0604* (2013.01); *G06F 3/0673* (2013.01); *G06F 13/1689* (2013.01); *G06F 13/4282* (2013.01)

(58) Field of Classification Search
CPC .... G06F 3/0604; G06F 3/0659; G06F 3/0673; G06F 9/4401; G06F 9/4406; G06F 9/4408; G06F 9/441; G06F 9/4411; G06F 13/1689; G06F 13/4282

USPC ............................................... 711/154; 713/2
See application file for complete search history.

(56) References Cited

U.S. PATENT DOCUMENTS

| | | | |
|---|---|---|---|
| 6,625,730 B1 * | 9/2003 | Angelo ................ | G06F 9/4401 713/1 |
| 2006/0168440 A1 * | 7/2006 | Huang ................... | G06F 9/441 713/2 |
| 2006/0174100 A1 * | 8/2006 | Park ...................... | G06F 9/4406 713/2 |
| 2006/0184781 A1 * | 8/2006 | Inada ....................... | G06F 8/60 713/1 |

(Continued)

FOREIGN PATENT DOCUMENTS

WO 2017/022300 A1 2/2017

*Primary Examiner* — Reginald G Bragdon
*Assistant Examiner* — Aaron D Ho
(74) *Attorney, Agent, or Firm* — Canon U.S.A., Inc. I.P. Division

(57) ABSTRACT

An information processing apparatus includes a control unit to execute a program, a first storage unit, a second storage unit, and an output unit. The first storage unit stores a first program to be executed by the control unit. The second storage unit stores a second program to be executed by the control unit. The output unit receives, from the control unit, a read command for reading the second program from the second storage unit. The output unit output, to the second storage unit, a corresponding command corresponding to the received read command and corresponding to an operation mode having been set to the output unit. Before transmitting, to the output unit, the read command for reading the second program from the second storage unit, the control unit sets the operation mode of the output unit according to the first program stored in the first storage unit.

12 Claims, 8 Drawing Sheets

(56) References Cited

U.S. PATENT DOCUMENTS

| | | | |
|---|---|---|---|
| 2009/0089570 A1* | 4/2009 | Andrianov | G06F 15/177 |
| | | | 713/2 |
| 2011/0202752 A1* | 8/2011 | Fujiwara | G06F 21/72 |
| | | | 713/2 |
| 2015/0074386 A1* | 3/2015 | Huang | G06F 9/4401 |
| | | | 713/2 |
| 2015/0134943 A1* | 5/2015 | Lee | G06F 21/78 |
| | | | 713/2 |
| 2017/0177376 A1* | 6/2017 | Toyoda | G06F 9/4411 |
| 2017/0255502 A1* | 9/2017 | Fujinami | G06F 11/1048 |

* cited by examiner

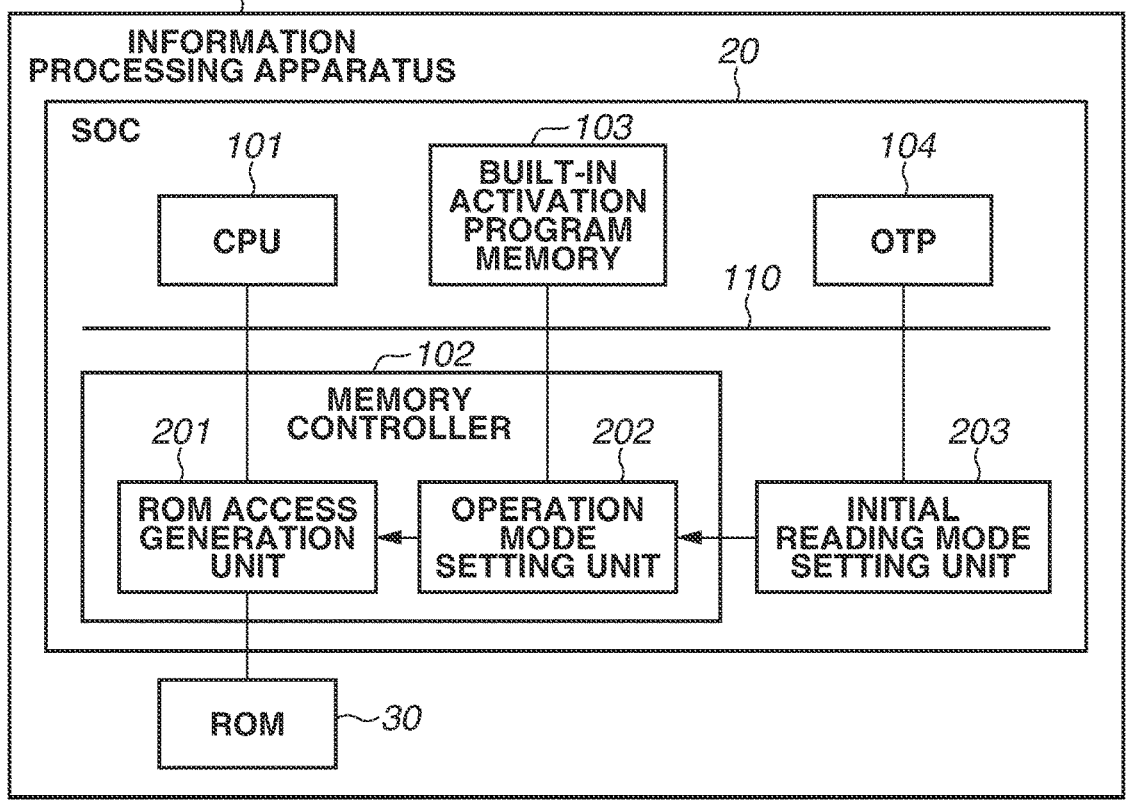
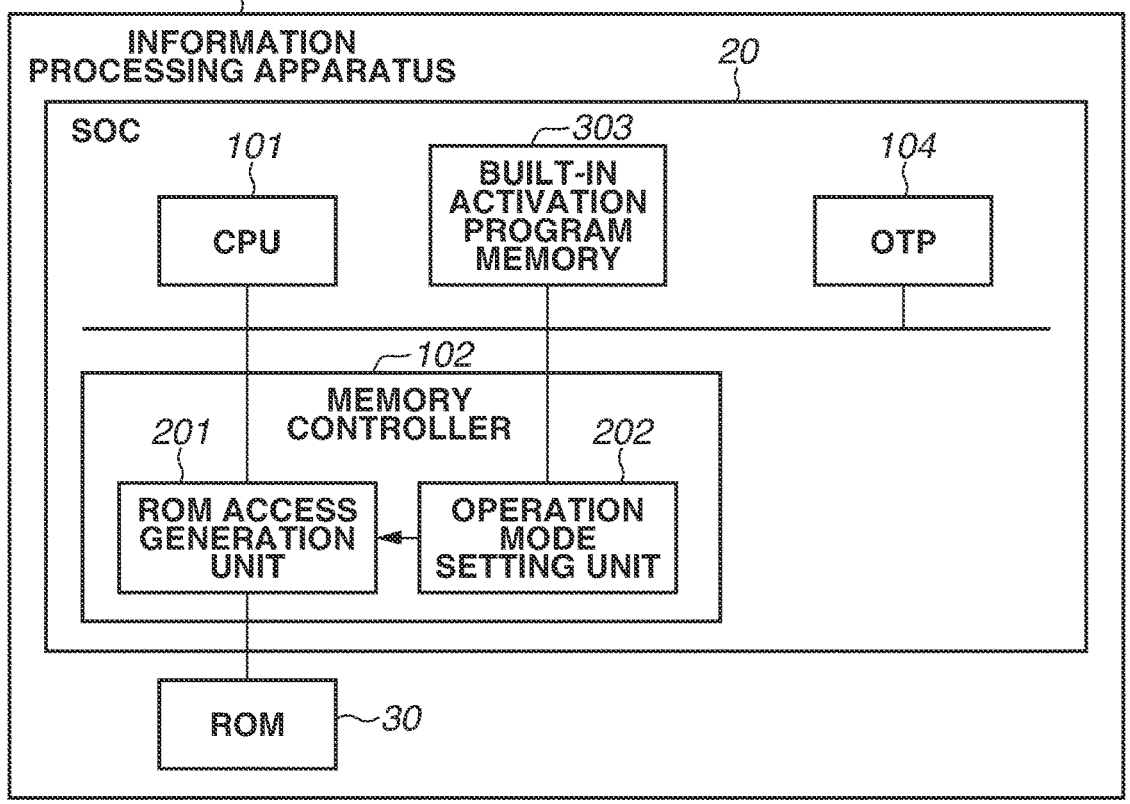

FIG.2A

| ROM TYPE | | | Input/Output | byte1 | byte2 | byte3 | byte4 | byte5 | byte6 | byte7 | byte8 | ROM ACCESS PATTERN |
|---|---|---|---|---|---|---|---|---|---|---|---|---|
| ROM1 (SPI ROM) | ROM2 (QSPI ROM) | ROM3 (QSPI ROM) | ROM ACCESS SPECIFICATION | | | | | | | | | |
| ○ | ○ | ○ | NUMBER OF CYCLES | 8 | 8 | 8 | 8 | 8 | 8 | 8 | — | PATTERN 1 |
| | | | command = FastRead | command = 0B(hex) | add(23:16) | add(15:8) | add(7:0) | dummy | (ReadData) | (ReadData) | — | |
| × | ○ | × | NUMBER OF CYCLES | 8 | 2 | 2 | 2 | 2 | 2 | 2 | — | PATTERN 2 |
| | | | command = FastRead QuadIO | command = EB(hex) | add(23:16) | add(15:8) | add(7:0) | contiuous | dummy | (ReadData) | (ReadData) | |
| × | × | ○ | NUMBER OF CYCLES | 2 | 2 | 2 | 2 | 2 | 2 | 2 | — | PATTERN 3 |
| | | | command = FastRead QuadIO | command = EB(hex) | add(23:16) | add(15:8) | add(7:0) | contiuous | dummy | (ReadData) | (ReadData) | |

FIG.2B

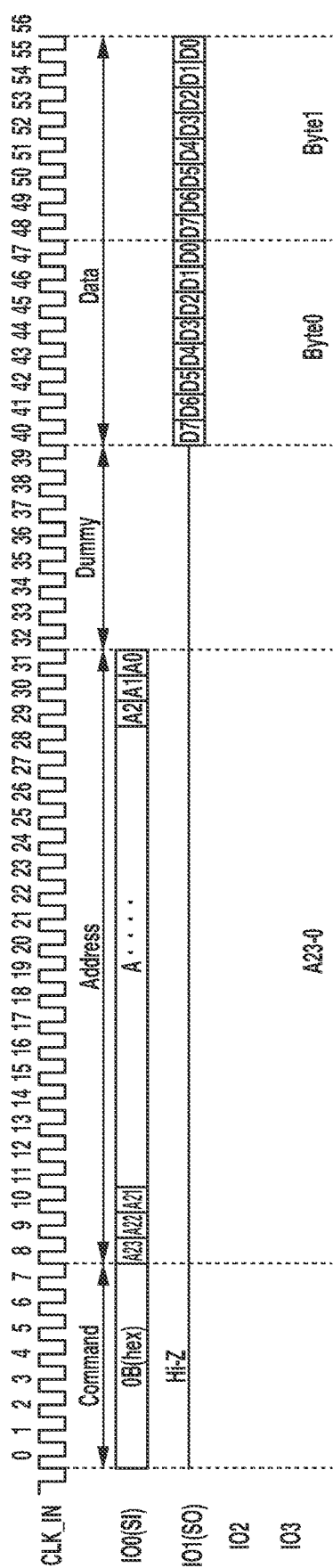

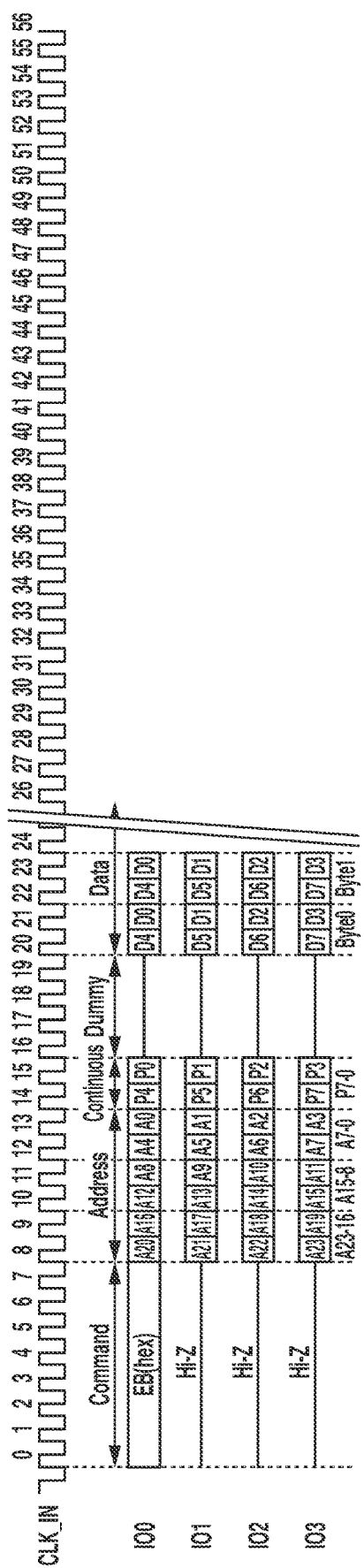
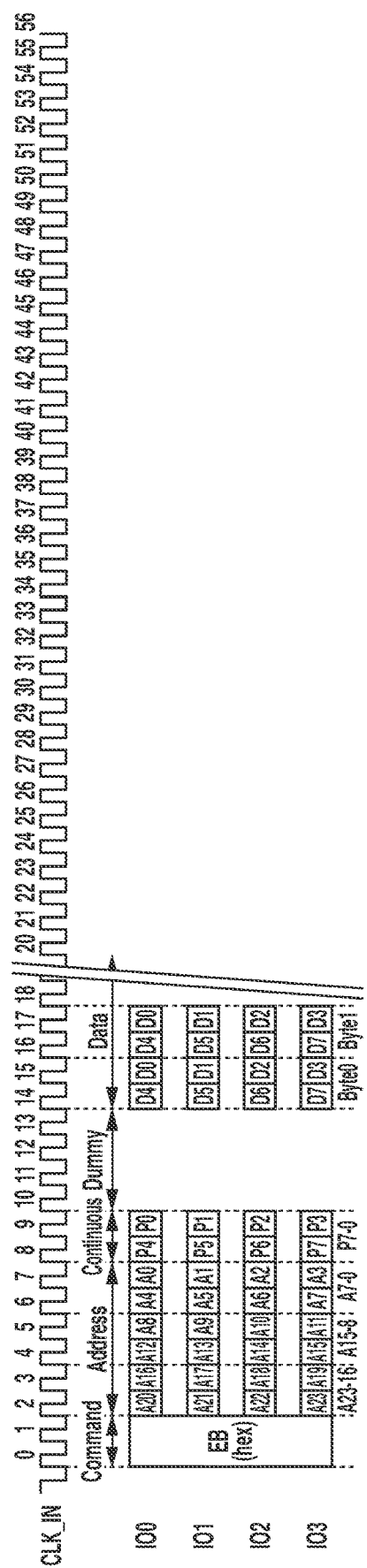

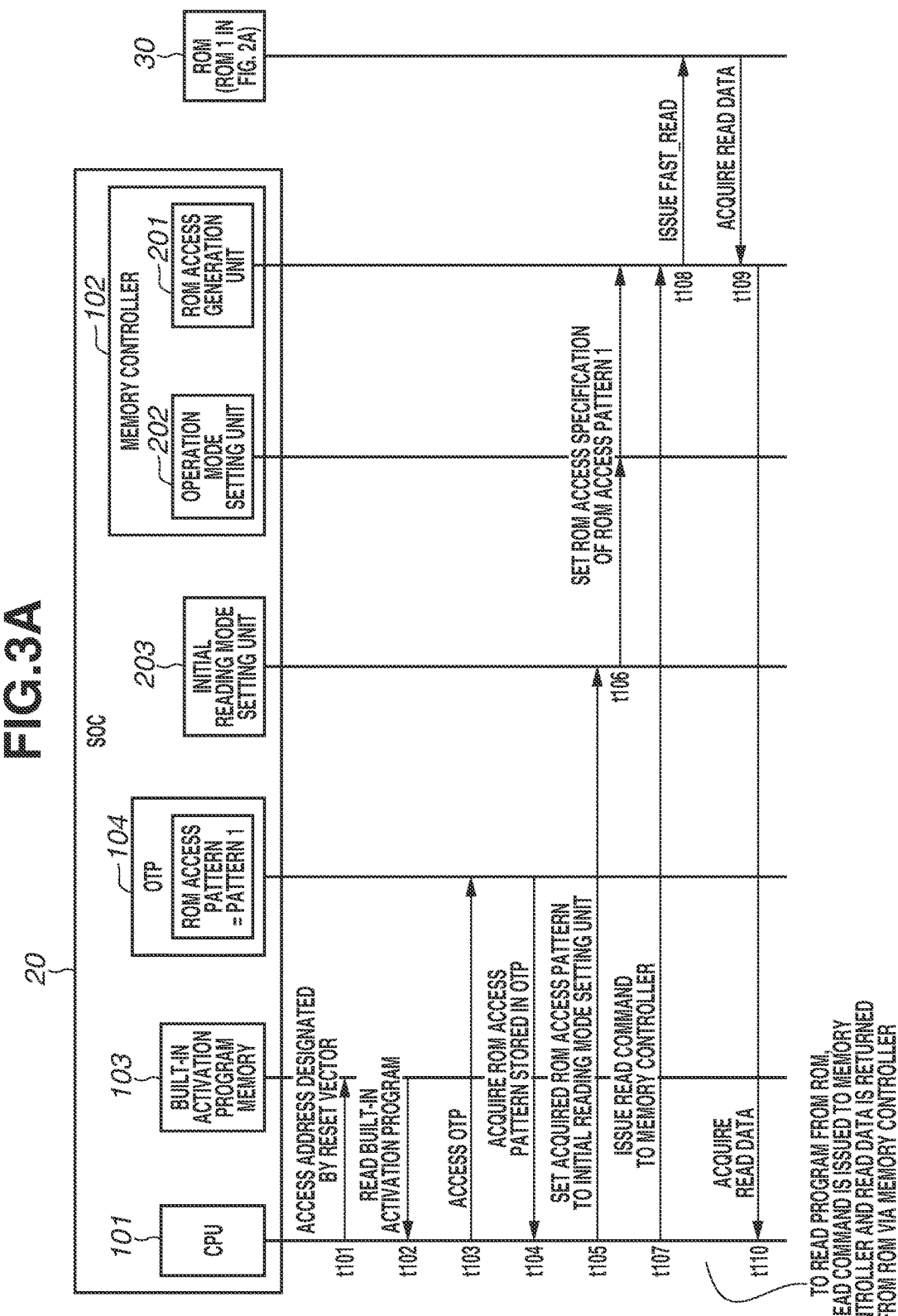

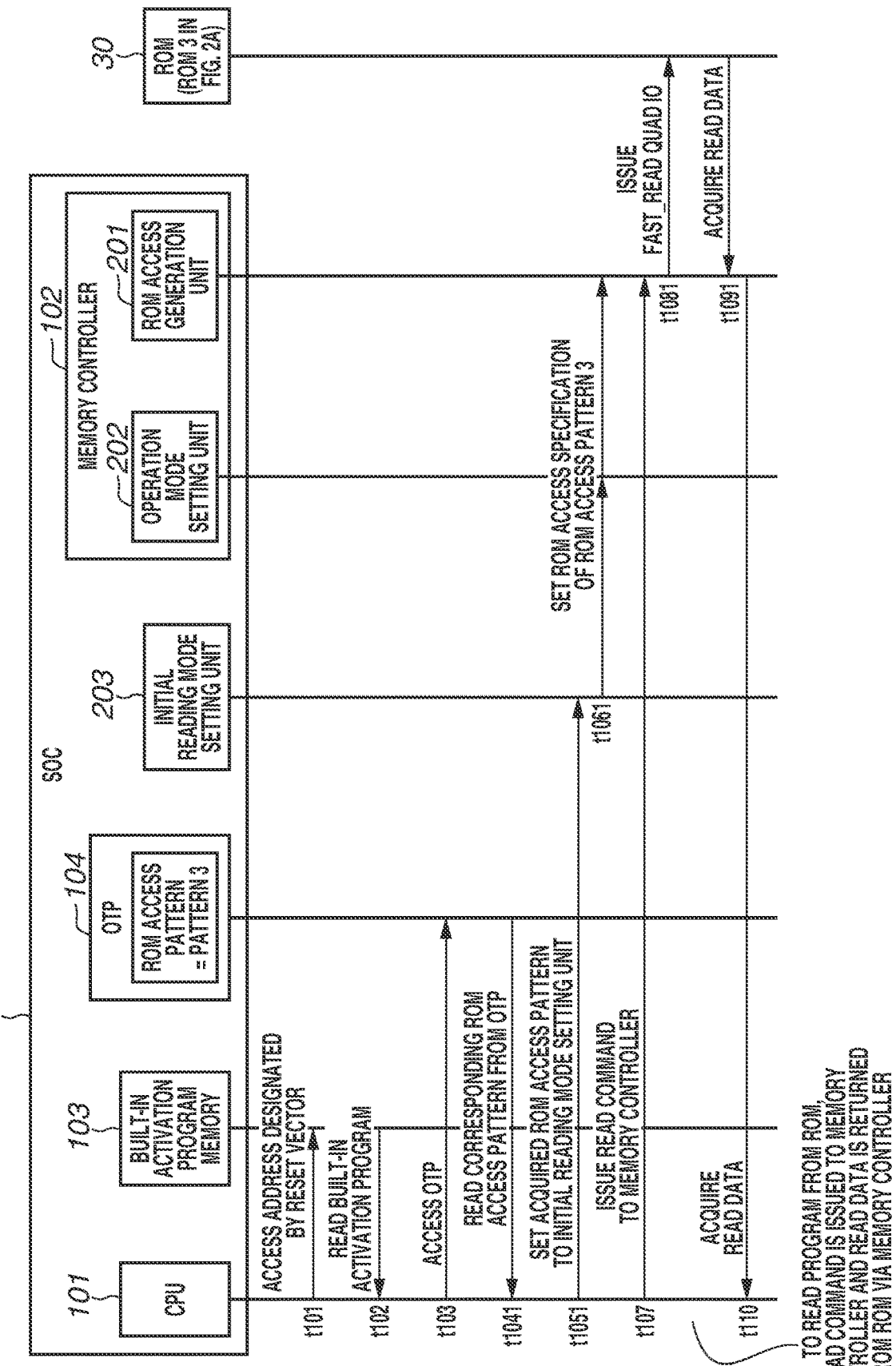

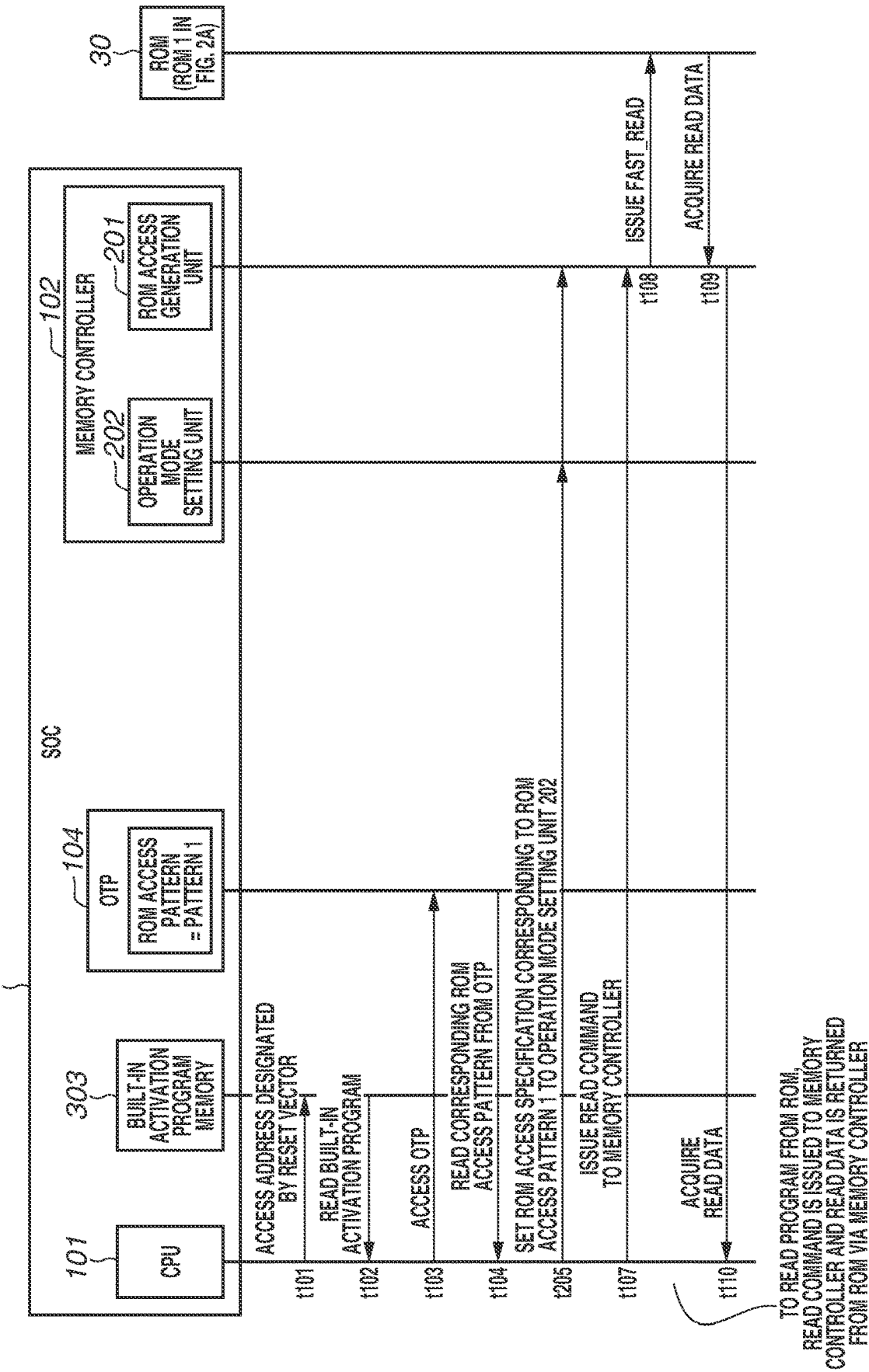

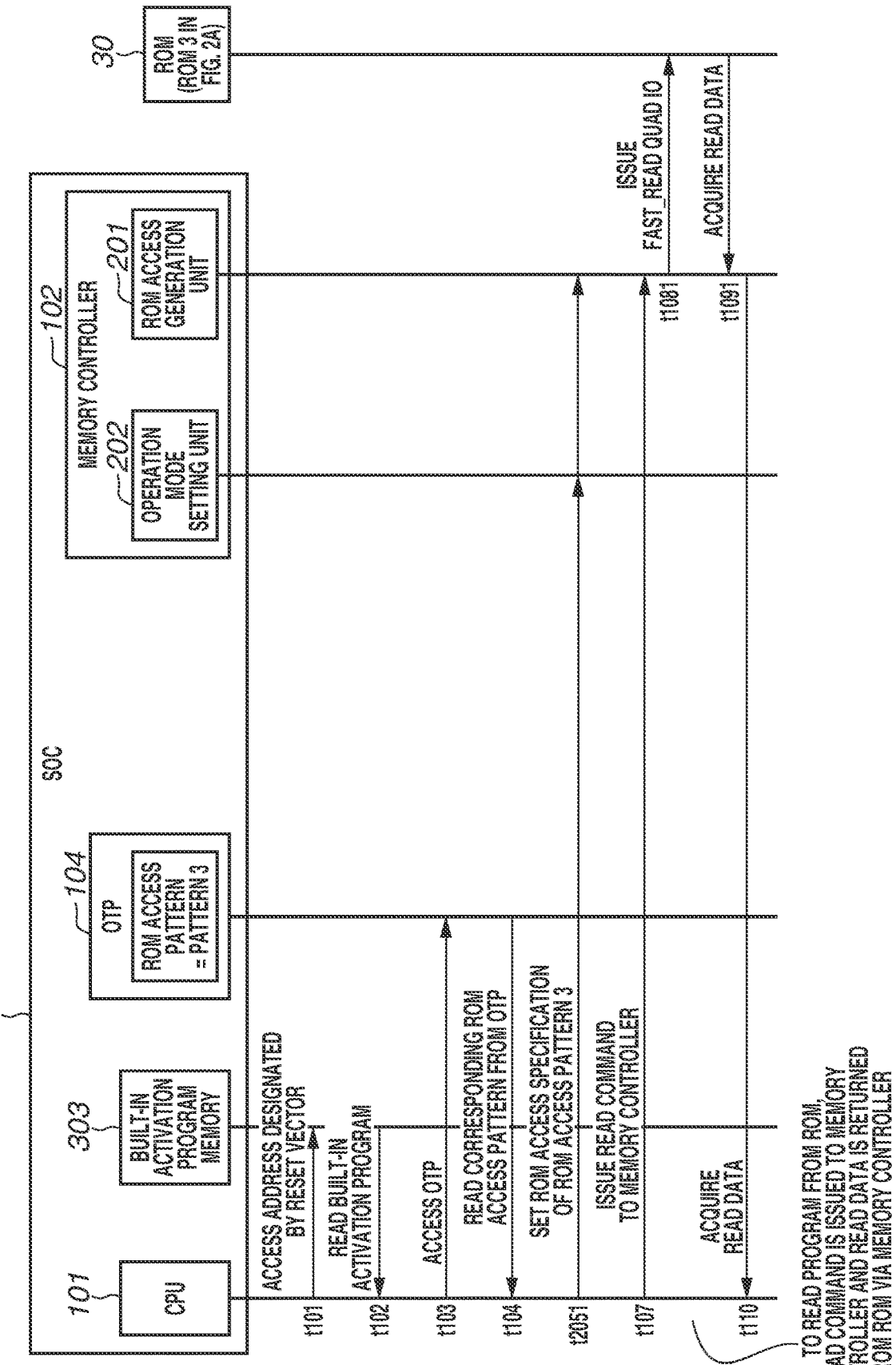

INFORMATION PROCESSING APPARATUS AND CONTROL METHOD THEREOF AND PROGRAM REGARDING READING A BOOT PROGRAM

BACKGROUND

Field

The present disclosure relates to an information processing apparatus, a control method thereof, and a program.

Description of the Related Art

A system on chip (SOC) on a controller substrate of an information processing apparatus is connected to a memory such as a read-only memory (ROM) configured to store a boot program for activating the information processing apparatus. After the information processing apparatus is turned on, a central processing unit (CPU) in the SOC reads and executes the boot program stored in the memory. There is a plurality of types of memories for storing a boot program, and a memory for use is selected based on a data transfer speed and capacity.

There is a plurality of read commands for different data transfer speeds that is to be used by a CPU to read a boot program from a memory, and some of the read commands can be used regardless of a memory type, whereas the other read commands can be used only for specific memories. For example, memories for data transfer using the Serial Peripheral Interface (SPI) standard include single SPI memories, which transfer data using a single input/output (IO) signal, and quad SPI memories, which transfer data using four 10 signal lines. A read command for transferring data using a single signal line can be used by any of the above-described memories. On the other hand, a read command for transferring data using four signal lines can be used by the quad SPI memories and cannot be used by the single SPI memories. Thus, a read command that can be used differs depending on the memory type.

WO 2017/022300 discusses an apparatus that reads, from a memory, a program for determining a read command to be used to read a remaining boot program using a read command that support any memories. Then, the apparatus reads the remaining boot program using a read command selected by executing the read program and executes boot processing. In this way, regardless of the type of the memory used to store the boot program, the boot program is readable using the read command supported by the memory.

However, the apparatus discussed in WO 2017/022300 starts reading the program using a command that can be used for any memory type so that the program can be read regardless of the type of the connected memory. In general, a command that can be used for any memory type is often slow in data transfer speed. Thus, in the case where the memory is accessed using a read command that can be used for any memory type, the time needed to read the program for determining a command for use in reading the remaining boot program can increase.

SUMMARY

According to an aspect of the present disclosure, a read command supported by a connected memory is selected and a boot program is read without accessing a memory storing the boot program.

According to an aspect of the present disclosure, an information processing apparatus includes a control unit configured to execute a program, a first storage unit configured to store a first program to be executed by the control unit, a second storage unit configured to store a second program to be executed by the control unit, and an output unit configured to receive, from the control unit, a read command for reading the second program from the second storage unit and output, to the second storage unit, a corresponding command corresponding to the received read command and corresponding to an operation mode having been set to the output unit, wherein, before transmitting, to the output unit, the read command for reading the second program from the second storage unit, the control unit sets the operation mode of the output unit according to the first program stored in the first storage unit.

Further features of the present disclosure will become apparent from the following description of exemplary embodiments with reference to the attached drawings.

BRIEF DESCRIPTION OF THE DRAWINGS

FIG. 1A illustrates a configuration of an information processing apparatus according to a first exemplary embodiment, and FIG. 1B illustrates a configuration of the information processing apparatus according to a second exemplary embodiment.

FIGS. 2A to 2D illustrate an example of a read command access pattern and a timing chart at a time of accessing a read-only memory (ROM) by a memory controller according to the first, second, and third exemplary embodiments.

FIGS. 3A and 3B illustrate a sequence of activating the information processing apparatus according to the first exemplary embodiment.

FIGS. 4A and 4B illustrate a sequence of activating the information processing apparatus according to the second exemplary embodiment.

DESCRIPTION OF THE EMBODIMENTS

Figure 5:
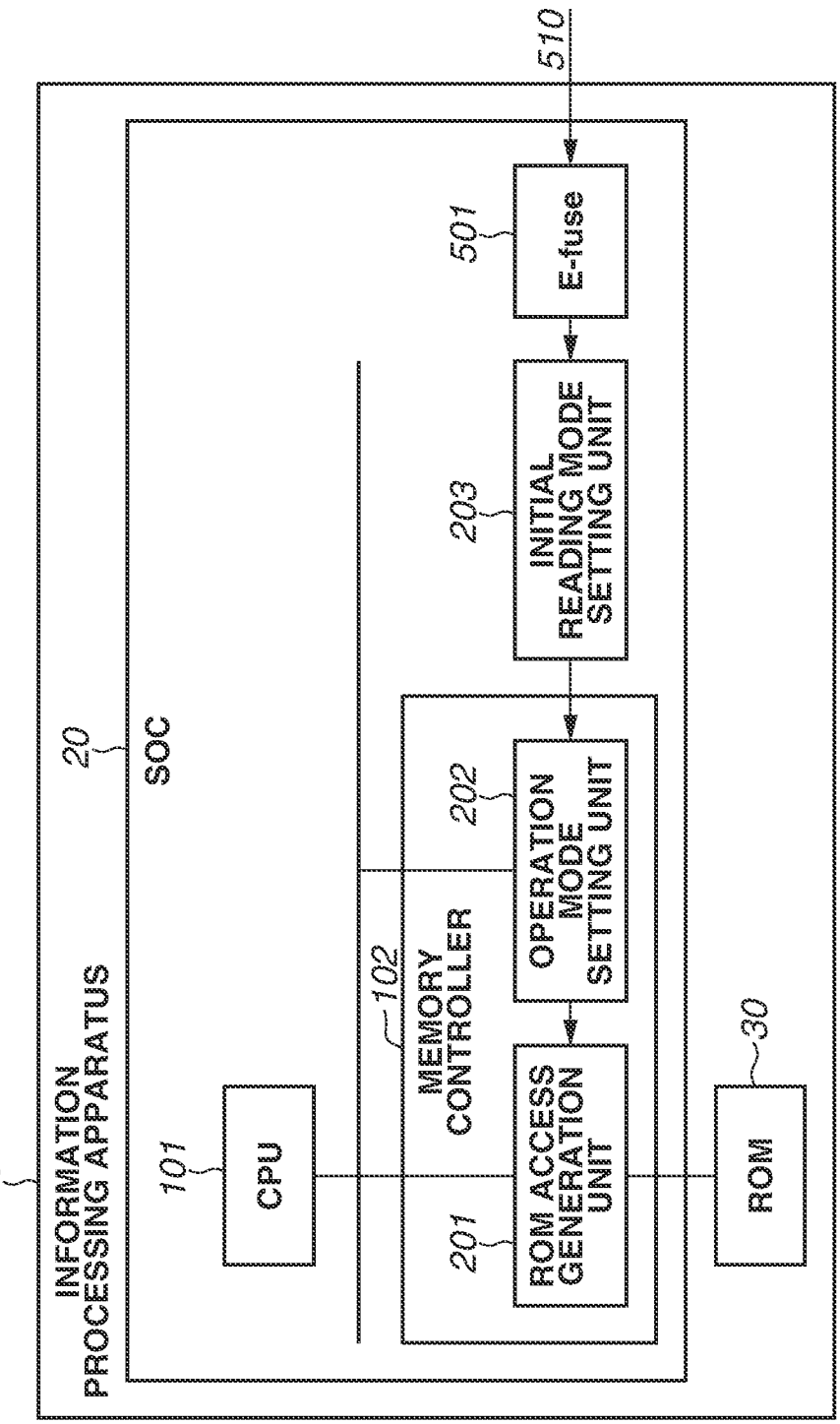
FIG. 5 illustrates a configuration of the information processing apparatus according to the third exemplary embodiment.

FIG. 1A illustrates a hardware configuration of an information processing apparatus 10 according to a first exemplary embodiment. The information processing apparatus 10 according to the present exemplary embodiment is, for example, a personal computer (PC) or a multi-function peripheral including a printer unit and a scanner unit.

A system on chip is a chip that integrates all components of an electronic system, such as a computer, on single substrate. The information processing apparatus 10 includes a system on chip (SOC) 20 and a read-only memory (ROM) 30. The SOC 20 includes a control module, an image processing module (not illustrated), and an external control interface. The control module includes a central processing unit (CPU) 101. The ROM 30 stores a boot program. To a bus 110 in the SOC 20 is connected a memory controller 102 configured to control data transfer of the SOC 20 and the ROM 30.

A serial peripheral interface (SPI) standard is a standard that includes specifying protocols for an interface bus to send data between, for example, microcontrollers and small peripherals. One of a plurality of types of Serial Peripheral Interface (SPI)_ROMs is connected as the ROM 30. In the description of the present exemplary embodiment, one of the three types of ROMs, a ROM 1, a ROM 2, and a ROM 3, is used as the ROM 30. The ROM 30 stores the boot program of the information processing apparatus 10 and a program for controlling the information processing apparatus 10.

The CPU 101 is a processor configured to control the entire information processing apparatus 10.

The memory controller 102 includes a ROM access generation unit 201 and an operation mode setting unit 202, and converts a bus protocol of access from the CPU 101 to the ROM 30.

The operation mode setting unit 202 is a module configured to set a ROM access specification to the ROM access generation unit 201. The term "ROM access specification" refers to information that indicates a specification about signals to be transmitted and received when the ROM access generation unit 201 accesses the ROM 30. The ROM access specification is, for example, information about a command indicating a cycle in which the command is to be output, a cycle at which an address is to be set, a cycle at which data is to be received, and the number of bytes of the data to be received.

The operation mode setting unit 202 assigns, to the ROM access generation unit 201, either the ROM access specification set by an initial reading mode setting unit 203 or the ROM access specification set to a register of the operation mode setting unit 202 by the CPU 101. The operation mode setting unit 202 includes the register for selecting which one of the above-described ROM access specifications is to be set to the ROM access generation unit 201. The register is set according to the control by the CPU 101, and one of the two ROM access specifications is set to the ROM access generation unit 201.

In the present exemplary embodiment, the operation mode setting unit 202 is set to set the ROM access specification of the initial reading mode setting unit 203 to the ROM access generation unit 201 when the information processing apparatus 10 is turned on and reset-released. After the information processing apparatus 10 reads the boot program, the operation mode setting unit 202 can switch between the ROM access specification set by the initial reading mode setting unit 203 and the ROM access specification set by the CPU 101 to determine which is to be set to the ROM access generation unit 201. In the case of using the ROM access specification set by the CPU 101, the CPU 101 sets an access specification such as a write command, status read command, or erase command supported by the SPI standard to the register of the operation mode setting unit 202. Thereafter, the CPU 101 instructs the ROM access generation unit 201 to execute the set command so that the command set to the operation mode setting unit 202 by the CPU 101 is output to the ROM 30 and executed.

The ROM access generation unit 201 issues a command to the ROM 30 according to the ROM access specification set by the operation mode setting unit 202 and performs data transfer with the ROM 30.

A built-in activation program memory 103 is a memory that stores the boot program to be first read and executed by the CPU 101 after the information processing apparatus 10 is turned on. The built-in activation program memory 103 is given an address on the bus 110. The address corresponds to an address set as a reset vector to be accessed by the CPU 101 after the CPU 101 is reset-released. In the present exemplary embodiment, a built-in activation program is stored in the built-in activation program memory 103, and the CPU 101 accesses the program so that the processing is started. Alternatively, hardware for executing the built-in activation program can be connected to the bus 110.

A one-time programmable ROM (OTP) 104 is a non-volatile memory that permits writing thereto only once. In the present exemplary embodiment, the OTP 104 stores a "ROM access pattern" which is information for selecting a read command to be used to read the boot program from the ROM 30 by the CPU 101. The "ROM access pattern" will be described later with reference to FIG. 2A. In the present exemplary embodiment, the "ROM access pattern" has three patterns, and each of the patterns is expressed so as to be identifiable by a 2-bit signal. The type of the ROM 30 is determined at the time of shipment from a factory, and 2-bit identification information corresponding to the ROM access pattern is written to the OTP 104 at the time of shipment from the factory. Alternatively, the ROM access pattern can be written to the OTP 104 at a timing other than the above-described timing. Further, the memory configured to store the ROM access pattern can be any non-volatile memory and can be a memory other than an OTP memory.

The initial reading mode setting unit 203 outputs the "ROM access specification", which will be described later with reference to FIG. 2A, to the operation mode setting unit 202. The initial reading mode setting unit 203 stores the access specification of the read command of each type of the ROM that may be connected to the memory controller 102. The CPU 101 executes the program stored in the built-in activation program memory 103 and sets the ROM access specification corresponding to the designated access pattern to the operation mode setting unit 202.

The initial reading mode setting unit 203 stores the ROM access specifications corresponding to three read commands. Further, the initial reading mode setting unit 203 includes a ROM access pattern register configured to set the "ROM access pattern" which will be described later with reference to FIG. 2A. The initial reading mode setting unit 203 includes a selector and outputs the ROM access specification corresponding to the value of the ROM access pattern register that is set by the CPU 101 among the three stored ROM access specifications. For example, if a pattern 1 of the "ROM access pattern" specified in FIG. 2A is set to the ROM access pattern register, the value of the "ROM access specification" specified in the row of the pattern 1 in FIG. 2A is output.

In the present exemplary embodiment, the CPU 101, the built-in activation program memory 103, the OTP 104, the initial reading mode setting unit 203, and the memory controller 102 are mounted on the single SOC 20 as described above.

Next, the types of each memory to be connected as the ROM 30 to the memory controller 102, and the ROM access specifications and ROM access patterns of the respective memories will be described below with reference to FIGS. 2A to 2D.

FIG. 2A is a table showing the types of ROMs that may be used as the ROM 30 and the read commands supported by the respective ROMs.

A "ROM type" specifies the type of each ROM that can be used as the ROM 30. In the present exemplary embodiment, the memory controller 102 supports three types of ROMs, the ROMs 1 to 3. The "ROM type" columns specify whether the commands specified in the rows can be respectively used for the ROMs 1 to 3. The symbol "o" indicates that the ROM can use the command specified in the row, whereas the symbol "x" indicates that the ROM cannot use the command specified in the row.

The "ROM access specification" is information that specifies data to be transferred when the SPI ROM executes the command, the number of bits of the data to be transferred, and the number of cycles to be used to transfer the data. In the present exemplary embodiment, one of the commands of three patterns is used at the time of reading the boot program from the ROM 30. Details of each command will be described below with reference to FIGS. 2B to 2D.

Access timings of the ROM access patterns 1 to 3 and the transfer speed of each command will be described below by comparing FIG. 2A and FIGS. 2B to 2D. In the present exemplary embodiment, each ROM address is 24 bits, and the size of data to be read is 2 bytes.

FIG. 2B is a timing chart illustrating a case of reading data using the read command of the ROM access pattern 1 specified in FIG. 2A. The read command of the access pattern 1 is a read command that can be used by any of the ROMs 1 to 3. The read command of the ROM access pattern 1 is a command for transferring a command, address, and data on a single signal line. In the case of using the read command of the ROM access pattern 1, the ROM 30 receives 0B(hex), which indicates a FastRead command, in eight cycles. Thereafter, the ROM 30 receives an address in 24 cycles. Next, the ROM 30 receives a Dummy signal in eight cycles. Thereafter, the ROM 30 outputs 2-byte read data using 16 cycles.

FIG. 2C is a timing chart illustrating a case of reading data using the read command of the ROM access pattern 2 specified in FIG. 2A. The read command of the access pattern 2 is a command that can be used only for the ROM 2. The read command designated by the ROM access pattern 2 is a command for transferring a command on a single signal line and transferring an address and data on four signal lines. The ROM 30 receives EB(hex), which indicates a FastRead quad 10 command, in eight cycles. Next, the ROM 30 receives an address in six cycles. The ROM 30 receives the address using the four signal lines. Thus, the number of cycles required to transfer the address is less than that in the case of using the ROM access pattern 1. Next, the ROM 30 receives a Continuous signal in two cycles. Thereafter, the ROM 30 receives a four-cycle clock signal as a Dummy cycle. Thereafter, the ROM 30 outputs 2-byte read data using four cycles. In the case of the ROM access pattern 2, the address and data are transferred on four signal lines, so that the time required to read data of the ROM 30 is less than that in the case of the ROM access pattern 1.

FIG. 2D is a timing chart illustrating a case of reading data using the read command of the ROM access pattern 3 specified in FIG. 2A. The ROM access pattern 3 is a read command that can be used only for the ROM 3. The ROM access pattern 3 is different from the ROM access pattern 2 in that a FastRead quad IO command is output on four signal lines. Thus, in the case of the ROM access pattern 3, the number of cycles required to output a command is less than that in the case of the ROM access pattern 2, and the time required to start reading data from the ROM 30 is shorter than that in the case of the ROM access pattern 2. The data transfer of the ROM access pattern 3 after the command is similar to that of the ROM access pattern 2.

By comparing FIGS. 2B to 2D, it is understood that the cycles required to read 2-byte data in the ROM access patterns 1, 2, and 3 are 56 cycles, 24 cycles, and 18 cycles, respectively. As described above, the time required to read data stored in the ROM 30 significantly varies by changing the command to be used to read the data. Thus, in a case of using a ROM that supports high-speed data transfer, it is desirable to read the boot program by using a read command of a high data transfer speed. In this way, the time required to read the boot program is reduced.

The ROM access pattern to be stored in the OTP 104 in each of the cases of using the respective ROMs as the memory storing the boot program will be described below with reference to FIG. 2A again.

The ROM 1 is a SPI ROM and does not support QUAD data transfer. In the case of using the ROM 1 as the ROM 30, the pattern 1 is the only ROM access pattern that can be used in data transfer between the memory controller 102 and the ROM 30. In the case of using the ROM 1 as the memory storing the boot program, the OTP 104 stores identification information for identifying the ROM access pattern 1.

The ROM 2 is a QSPI ROM and supports QUAD data transfer. In the case of using the ROM 2 as the ROM 30, there are two patterns, the patterns 1 and 2 that can be used in data transfer between the memory controller 102 and the ROM 30. In the case of using the ROM 2 as the memory storing the boot program, the OTP 104 stores identification information for identifying the ROM access pattern 2 for higher-speed data transfer.

The ROM 3 is a QSPI ROM and supports QUAD data transfer. In the case of using the ROM 3 as the ROM 30, there are two patterns, the patterns 1 and 3 that can be used in data transfer between the memory controller 102 and the ROM 30. In the case of using the ROM 3 as the memory storing the boot program, the OTP 104 stores identification information for identifying the ROM access pattern 3 for higher-speed data transfer.

As described above, the ROM access pattern to be stored in the OTP 104 is desirably the ROM access pattern that corresponds to the command of the least number of cycles required to transfer data, among the read commands supported by the ROMs to be used as the ROM 30. In this way, the time needed for the CPU 101 to start reading the boot program when the information processing apparatus 10 is turned on is reduced.

FIGS. 3A and 3B are sequences illustrating the processing executed when the information processing apparatus 10 is activated according to the first exemplary embodiment.

FIG. 3A is a sequence diagram illustrating the case in which the ROM 1 illustrated in FIG. 2A is connected as the ROM 30. The identification information for identifying the ROM access pattern 1 among the read commands supported by the ROM 1 is written to the OTP 104.

FIG. 3B is a sequence diagram illustrating the case in which the ROM 3 illustrated in FIG. 2A is connected as the ROM 30. The identification information for identifying the ROM access pattern 3 is written to the OTP 104. The ROM access pattern 3 is the read command that requires the shortest time to start reading data among the read commands supported by the ROM 3.

First, a case of reading the boot program from the ROM 1 will be described below with reference to FIG. 3A.

After the information processing apparatus 10 is turned on and the supply of power to the CPU 101 is started, a reset signal is input to the CPU 101 for a predetermined period of time. While the reset signal is input to the CPU 101, the CPU 101 does not perform activation processing and stands ready.

In step t101, the reset signal input to the CPU 101 is cancelled, and the CPU 101 accesses a start address set by the reset vector. The address set by the reset vector herein is the address of the built-in activation program memory 103.

After accessing the built-in activation program memory 103, in step t102, the CPU 101 reads the built-in activation program from the built-in activation program memory 103, develops the read program to a random access memory (RAM) (not illustrated), and executes the program. Steps t103 to t105, t107, and t110 thereafter are the processing to be executed by the CPU 101 according to the content of the built-in activation program.

The CPU 101 that executes the program read in step t102 reads information from the OTP 104 in step t103. Then, in step t104, the CPU 101 acquires the ROM access pattern stored in the OTP 104. In FIG. 3A, the ROM 1 specified in FIG. 2A is connected as the ROM 30, so that the identification information for identifying the ROM access pattern 1 is acquired.

In step t105, the CPU 101 sets the ROM access pattern acquired in step t104 to the ROM access pattern register of the initial reading mode setting unit 203. The CPU 101 sets the ROM access pattern 1 to the ROM access pattern register of the initial reading mode setting unit 203.

In step t106, the initial reading mode setting unit 203 sets the ROM access specification corresponding to the set ROM access pattern to the operation mode setting unit 202 based on the value of the ROM access pattern register set in step t105. The operation mode setting unit 202 is set so as to output the setting made by the initial reading mode setting unit 203 as it is at the time of activation. Thus, the operation mode setting unit 202 outputs the ROM access specification set by the initial reading mode setting unit 203 as it is to the ROM access generation unit 201. Specifically, the operation mode setting unit 202 sets the ROM access specification corresponding to the ROM access pattern 1 specified in FIG. 2A to the ROM access generation unit 201.

The information processing apparatus 10 executes steps t101 to t106, so that the CPU 101 can select a command to be used to read the boot program from the ROM 30 without accessing the ROM 30.

In step t107, the CPU 101 issues a read command to the ROM access generation unit 201 in order to read the boot program for activating the information processing apparatus 10 from the ROM 30. At this time, the CPU 101 outputs the read command and the address to the ROM access generation unit 201. Information about the address to be output by the CPU 101 at the time may be stored on any one of the memories on the SOC 20. For example, the built-in activation program memory 103 stores the address where the boot program is stored. The CPU 101 executes the program stored in the built-in activation program memory 103 to access the storage location of the boot program in the ROM 30.

Then, in step t108, the ROM access generation unit 201 issues a read command to the ROM 30 based on the command and the address received from the CPU 101 and the ROM access specification set by the operation mode setting unit 202 by the time of step t106. In this example, a FAST_READ command is issued to the ROM 30. The ROM 30 receives a signal specified in the timing chart in FIG. 2B according to the command output from the ROM access generation unit 201. Then, the boot program is returned to the ROM access generation unit 201 in the Data (cycle 40 and subsequent cycles) phase in FIG. 2B.

In step t109, the ROM access generation unit 201 acquires read data output from the ROM 30 according to the command output in step t108. Then, in step t110, the ROM access generation unit 201 transfers the acquired boot program to the CPU 101. In step t110 and thereafter, the CPU 101 executes the boot program transferred from the ROM access generation unit 201. In this way, the CPU 101 executes boot processing of the information processing apparatus 10.

The sequence from steps t107 to t110 is the sequence that is executed each time the CPU 101 reads the program from the ROM 30.

In the present exemplary embodiment, the boot program stored in the ROM 30 is read using the read command designated by the ROM access pattern stored in the OTP 104. In this way, the CPU 101 can read the boot program using a command system suitable for the type of the connected ROM without accessing the ROM storing the boot program.

Next, the processing in the case of using the ROM 3 as the memory storing the boot program will be described below with reference to FIG. 3B. Only a difference from FIG. 3A will be described below.

In step t1041, the CPU 101 accesses the OTP 104 and acquires a ROM access pattern. At the time, the OTP 104 stores the identification information for identifying the ROM access pattern 3, and the CPU 101 acquires the identification information corresponding to the ROM access pattern 3.

Then, in step t1051, the ROM access pattern 3 is set to the initial reading mode setting unit 203. In step t1061, the initial reading mode setting unit 203 sets the ROM access specification of the ROM access pattern 3 to the operation mode setting unit 202 based on the information about the ROM access pattern set by the CPU 101. Then, the operation mode setting unit 202 sets the access specification of the ROM access pattern 3 to the ROM access generation unit 201.

The access specification corresponding to the ROM access pattern 3 is set to the operation mode setting unit 202 and the ROM access generation unit 201. Thus, if the CPU 101 issues a read command to the ROM access generation unit 201, then in step t1081, the ROM access generation unit 201 accesses the ROM 30 using the access specification corresponding to the ROM access pattern 3. Then, in step t1091, the ROM access generation unit 201 acquires read data using the access specification corresponding to the ROM access pattern 3. In this way, the CPU 101 acquires the boot program from the ROM 30. In the case of using the ROM 3 as the memory storing the boot program as described above, the boot program is read faster compared to the case of using the ROM 1 as the ROM 30 storing the boot program.

As described above, according to the present exemplary embodiment, the information for identifying the ROM access pattern that corresponds to the type of the connected memory is stored in the OTP 104. Then, the CPU 101 reads the ROM access pattern information stored in the OTP 104 before reading the boot program according to the built-in program. The CPU 101 accesses the ROM 30 based on the access specification identified using the read ROM access pattern and reads the stored boot program from the ROM 30. In this way, the boot program is read using the read command that corresponds to the type of the connected ROM 30. Thus, for example, the time needed to perform boot processing is reduced in the case of using a ROM of high data transfer speed.

While the three types of ROMs corresponding to the ROM 30 and the three types of ROM access patterns are described in the present exemplary embodiment, the ROM types and the ROM access patterns are not limited to those described above.

A second exemplary embodiment will be described below. In the first exemplary embodiment, the initial reading mode setting unit 203 including the selector is included, and the CPU 101 sets, to the initial reading mode setting unit 203, the identification information about the ROM access pattern to be used to read the boot program. The initial reading mode setting unit 203 sets, to the operation mode setting unit 202, the ROM access specification identified by the identification information set to the register by the CPU 101, among the plurality of ROM access patterns. In the second exemplary embodiment, the initial reading mode setting unit 203 is not included, and the CPU 101 sets the ROM access specification to the operation mode setting unit 202. In this way, even a hardware configuration that does not include the initial reading mode setting unit 203 realizes access to the memory storing the boot program in a way that is suitable for the memory and realizes reading of the boot program without accessing the memory.

FIG. 1B illustrates a basic hardware configuration of the information processing apparatus 10 according to the second exemplary embodiment. Each component similar to that in the first exemplary embodiment is given the same reference numeral, and only a difference from the first exemplary embodiment will be described below.

The information processing apparatus 10 according to the second exemplary embodiment does not include the initial reading mode setting unit 203. Further, a built-in activation program memory 303 of the information processing apparatus according to the second exemplary embodiment stores a program different from the program stored in the built-in activation program memory 103 according to the first exemplary embodiment. Since the information processing apparatus 10 according to the second exemplary embodiment does not include the initial reading mode setting unit 203, the CPU 101 executes the program stored in the built-in activation program memory 303 and sets the ROM access specification to the operation mode setting unit 202. Thus, the built-in activation program memory 303 stores the ROM access specifications that respectively correspond to the ROM access patterns. The CPU 101 reads, from the built-in activation program memory 303, the ROM access specification corresponding to the ROM access pattern read from the OTP 104 and sets the read ROM access specification to the operation mode setting unit 202.

The difference between the program stored in the built-in activation program memory 303 and the program stored in the built-in activation program memory 103 according to the first exemplary embodiment will be described below with reference to a sequence diagram illustrated in FIGS. 4A and 4B.

FIGS. 4A and 4B are diagrams illustrating a sequence at the time of activation of the information processing apparatus 10 according to the second exemplary embodiment. The processing in FIGS. 4A and 4B that is similar to that in FIGS. 3A and 3B is given the same reference numeral. Description of the processing similar to the first exemplary embodiment is omitted, and a difference from the first exemplary embodiment will be described below.

In step t104, the CPU 101 acquires the identification information that specifies the ROM access pattern from the OTP 104. Then, in step t205, the CPU 101 sets the ROM access specification corresponding to the identification information about the ROM access pattern read in step t104, to the register of the operation mode setting unit 202 for setting the "ROM access specification". In FIG. 4A, the ROM access specification corresponding to the ROM access pattern 1 is set to the register of the operation mode setting unit 202. The operation mode setting unit 202 outputs the ROM access specification set to the register for setting the "ROM access specification" to the ROM access generation unit 201.

FIG. 4B is a sequence diagram illustrating the case in which the OTP 104 stores the identification information that specifies the ROM access pattern 3. In step t2051, the CPU 101 sets the access specification of the access pattern 3 to the register for storing the access specification of the operation mode setting unit 202. The operation mode setting unit 202 outputs the ROM access specification corresponding to the set ROM access pattern 3 to the ROM access generation unit 201. In this way, in step t1801, the ROM access generation unit 201 accesses the ROM 30 using a system that supports the ROM access pattern 3.

In this way, even the information processing apparatus 10 that does not include the initial reading mode setting unit 203 realizes reading access suitable for the ROM storing the boot program without accessing the ROM before reading the boot program.

A third exemplary embodiment will be described below. In the first and second exemplary embodiments, the CPU 101 controls any one of the read commands to access the ROM 30 using the built-in activation program memory 103 or 303 and the OTP 104. According to the third exemplary embodiment, the CPU 101 that executes performing a most-suitable reading operation for the type of the connected ROM 30 without executing the built-in activation program.

In the third exemplary embodiment, the memory controller 102 reads the boot program stored in the ROM 30 using a FastRead command or FastRead quad IO command.

FIG. 5 illustrates a basic hardware configuration of the information processing apparatus 10 according to the third exemplary embodiment. A hardware configuration similar to the first or second exemplary embodiment is given the same reference numeral, and description thereof is omitted.

The information processing apparatus 10 according to the third exemplary embodiment does not include the built-in activation program memory 103 and the OTP 104 but includes an E-fuse 501. The E-fuse 501 is a fuse, and a high or low output is realized by continuously connecting or disconnecting the fuse. A voltage is applied using a tool to an individual signal 510 extending to the outside of the SOC 20, so that the fuse is disconnected and a low output is output.

The ROM access pattern corresponding to the memory used as the ROM 30 is written from the individual signal 510 to the E-fuse 501 at the time of shipment from the factory. The initial reading mode setting unit 203 sets the access specification corresponding to the output of the E-fuse 501 to the operation mode setting unit 202. In this way, when the CPU 101 read-accesses the ROM access generation unit 201 after the information processing apparatus 10 is activated, the CPU 101 accesses the ROM 30 using the access specification set to the operation mode setting unit 202. Thus, the highest-speed read command suitable for the type of the ROM 30 can be used.

Accordingly, even in the case where the information processing apparatus 10 does not include the built-in activation program memory 103 and the OTP 104, the CPU 101 can select a command suitable for use in reading the boot program from the ROM 30 without accessing the ROM 30.

Further, while the present specification describes the tool and the application voltage that are required for the E-fuse 501 in the exemplary embodiment, this description is not intended to limit the embodiment to the E-fuse 501, and any module to which information for identifying the ROM access pattern is writable can be used.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an aspect of the present disclosure, a read command supported by a connected memory is selected and a boot program is read without accessing a memory storing the boot program.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-185428, filed Sep. 28, 2018, which is hereby incorporated by reference herein in its entirety.

What is claimed is:

1. An information processing apparatus comprising:
   a processor;
   a first memory configured to store a boot program to be executed by the processor;
   a second memory configured to store data indicating an operation mode, related to a method for accessing the first memory;
   a controller configured to read the boot program from the first memory based on a set operation mode, and transmit the read boot program to the processor; and
   a third memory configured to store a setting program for reading the stored data from the second memory and setting the operation mode in the controller,
   wherein, by executing the setting program, the processor reads the stored data from the second memory and sets the operation mode in the controller based on the read data.

2. The information processing apparatus according to claim 1,
   wherein the processor transmits a read command of the boot program to the controller after setting the operation mode in the controller, and
   wherein the controller acquires the boot program from the first memory based on reception of the read command.

3. The information processing apparatus according to claim 2, wherein the processor acquires the boot program via the controller.

4. The information processing apparatus according to claim 2, wherein the controller outputs an address that specifies a storage location of the boot program in the first memory through a sequence based on the read command transmitted by the processor.

5. The information processing apparatus according to claim 1, further comprising a setting object configured to store a plurality of operation modes including the operation mode,
   wherein the processor reads the stored data and sets the operation mode via the setting object.

6. The information processing apparatus according to claim 1, wherein the second memory is a memory configured to permit writing to the second memory only once.

7. The information processing apparatus according to claim 1,
   wherein the first memory is a memory configured to transfer data to the processor at a first data transfer speed and at a second data transfer speed which is faster than the first data transfer speed, and
   wherein the processor selects a command for reading data stored in the first memory at the second data transfer speed.

8. The information processing apparatus according to claim 1, wherein the first memory transfers data on one line of a plurality of signal lines, and the second memory transfers data on the plurality of signal lines.

9. The information processing apparatus according to claim 1, wherein an address of the third memory is set as an address to be accessed first, when power is supplied to the information processing apparatus, by the processor.

10. The information processing apparatus according to claim 1, wherein the controller and the first memory transfer data according to a serial peripheral interface (SPI) standard.

11. The information processing apparatus according to claim 1, wherein the processor, the second memory, and the controller are mounted on a single system on chip (SOC).

12. A method to control an information processing apparatus having a processor, a controller, and first, second, and third memories, the method comprising:
    storing, in the first memory, a boot program to be executed by the processor;
    storing, in the second memory, data indicating an operation mode, related to a method for accessing the first memory;
    reading, via the controller, the boot program from the first memory based on a set operation mode, and transmitting, via the controller, the read boot program to the processor; and
    storing, in the third memory, a setting program for reading the stored data from the second memory and setting the operation mode in the controller,
    wherein, by executing the setting program, the processor reads the stored data from the second memory and sets the operation mode in the controller based on the read data.

* * * * *